Figure 1:
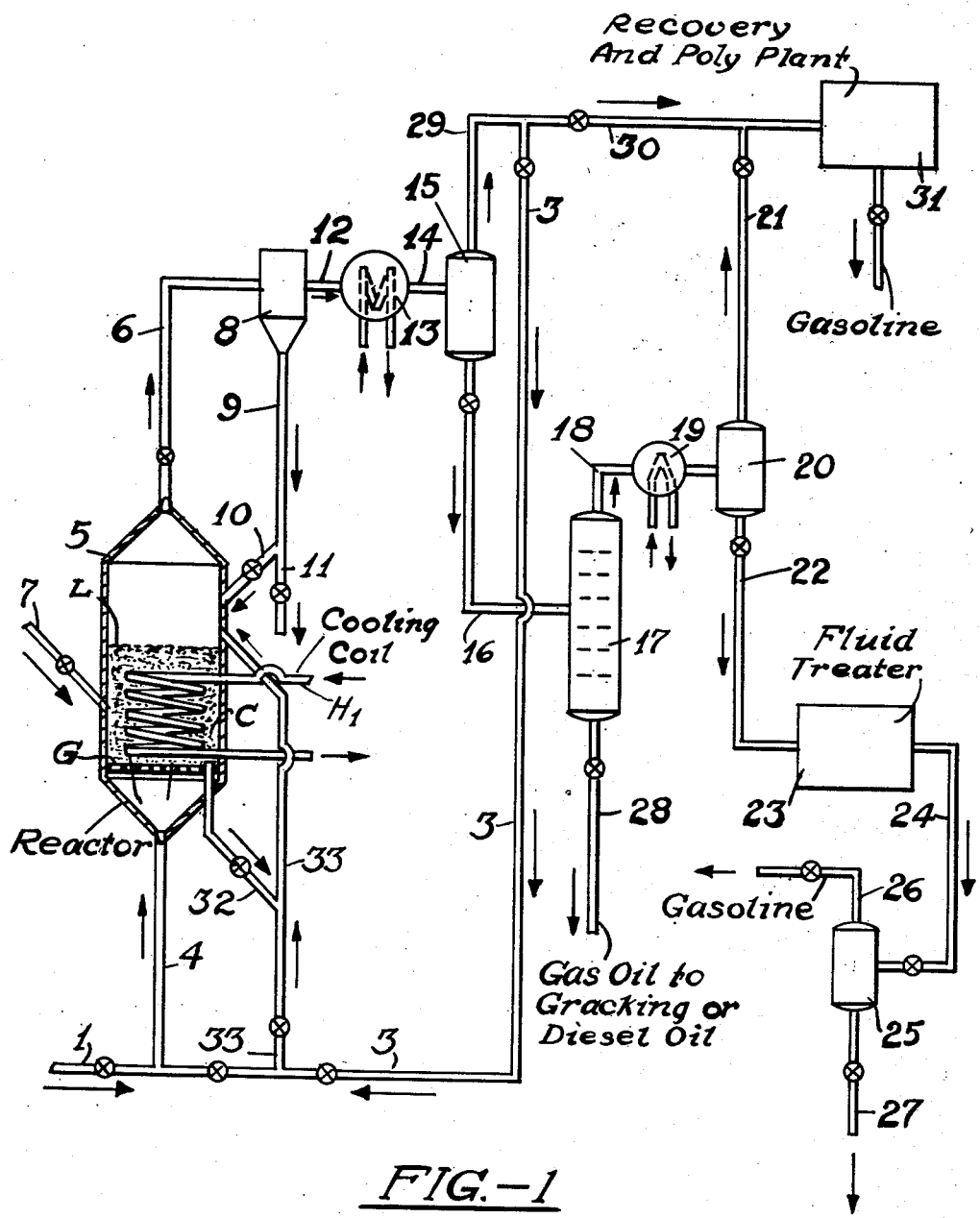

Patented Sept. 8, 1953

2,651,653

UNITED STATES PATENT OFFICE 2,651,653

TWO-STAGE HYDROCARBON SYNTHESIS

Charles E. Hemminger, Westfield, N. J., assignor to Standard Oil Development Company, a corporation of Delaware Application December 18, 1948, Serial No. 66,115

1 Claim. (Cl. 260—449.6)

The present invention relates to improvements in the synthesis of hydrocarbons. More particularly, the present invention relates to a single or multi-stage hydrocarbon synthesis process employing cobalt as the catalyst.

Heretofore, a method of synthesizing hydrocarbons from a gaseous feed containing hydrogen and carbon monoxide and employing a cobalt catalyst was known. This earlier process resulted in the production of a normally liquid hydrocarbon of high paraffinic content.

It has now been discovered that by employing a cobalt-type catalyst under conditions hereinafter set forth more fully, a hydrocarbon product including a gasoline fraction may be synthesized from carbon monoxide and hydrogen, which gasoline fraction will have an improved octane rating due to the fact that it contains substantial quantities of olefinic hydrocarbons. In order further to improve the quality of the gasoline thus produced, the present invention contemplates aftertreating the gasoline with an active cracking catalyst such as a synthetic silica-alumina gel cracking catalyst or activated clays such as acid treated montmorillonite, or even activated bauxite.

An important feature involves the use of a relatively low hydrogen-carbon monoxide ratio in the feed gas, coupled with relatively high reaction temperatures.

It is a matter of record that heretofore relatively low hydrogen-carbon monoxide ratios in the feed gas to the hydrocarbon synthesis process employing a cobalt-type catalyst had been proposed. However, the temperatures proposed in these earlier processes were relatively low, for the matter of controlling temperature was difficult since these proposals had to do with fixed bed type of operation.

It has now been discovered that by employing the fluid catalyst technique, low hydrogen to carbon monoxide ratios in the feed, that is to say, ratios within the range of from .8 to 1.5 mols of hydrogen per mol of carbon monoxide (i. e., in the total feed) may be successfully employed with a cobalt-type catalyst, even at elevated temperature, without incurring the difficulties of the older fixed bed type of operation, where inordinately large quantities of methane and other normally gaseous hydrocarbons were formed.

It is another feature of this invention that although one starts with cobalt catalyst of the proper size for good fluidization, after the operation has been on stream for some period of time, there is a tendency for the catalyst to undergo fragmentation to form fines. This invention includes the concept of permitting these fines to be removed from the reactor by elutriation. The observable effect of this particular feature of the invention is that any tendency of whatever wax or heavy oils formed to interfere with good fluidization of the catalyst is repressed.

Another feature of the present invention which aids in securing the foregoing desirable results is that there is a low conversion of carbon monoxide per pass, this conversion amounting to 40–50% of the carbon monoxide feed to the reaction. Of course, in order to attain high ultimate conversions, the present invention contemplates either recycling the unconverted reactants and hydrocarbons lighter than butanes or passing them through a subsequent stage or stages.

An object of the present invention, therefore, is to synthesize hydrocarbons, using a cobalt-type catalyst to produce a normally liquid hydrocarbon product, including a gasoline product of high octane rating, in good yields.

Another object of the present invention is to conduct the hydrocarbon synthesis operation employing the fluid catalyst technique under conditions which will tend to maintain the catalyst throughout the extended period of operation in a state where it is adapted for good fluidization.

Another object of the present invention is to produce by synthesis using hydrogen and carbon monoxide as reactants in the cobalt-type catalyst, normally liquid hydrocarbons of increased olefinicity.

Another object of the present invention is to synthesize hydrocarbons from hydrogen and carbon monoxide under conditions such that the product is substantially free of oxygenated hydrocarbons and, as such, is a desirable intermediate for the manufacture of valuable chemicals such as alcohols, fatty acids, lubricating oils, various detergents, etc., because of its high olefin content.

Other and further objects of the present invention will be apparent from the following more detailed description and claims considered in connection with the accompanying drawings.

Figure 2:
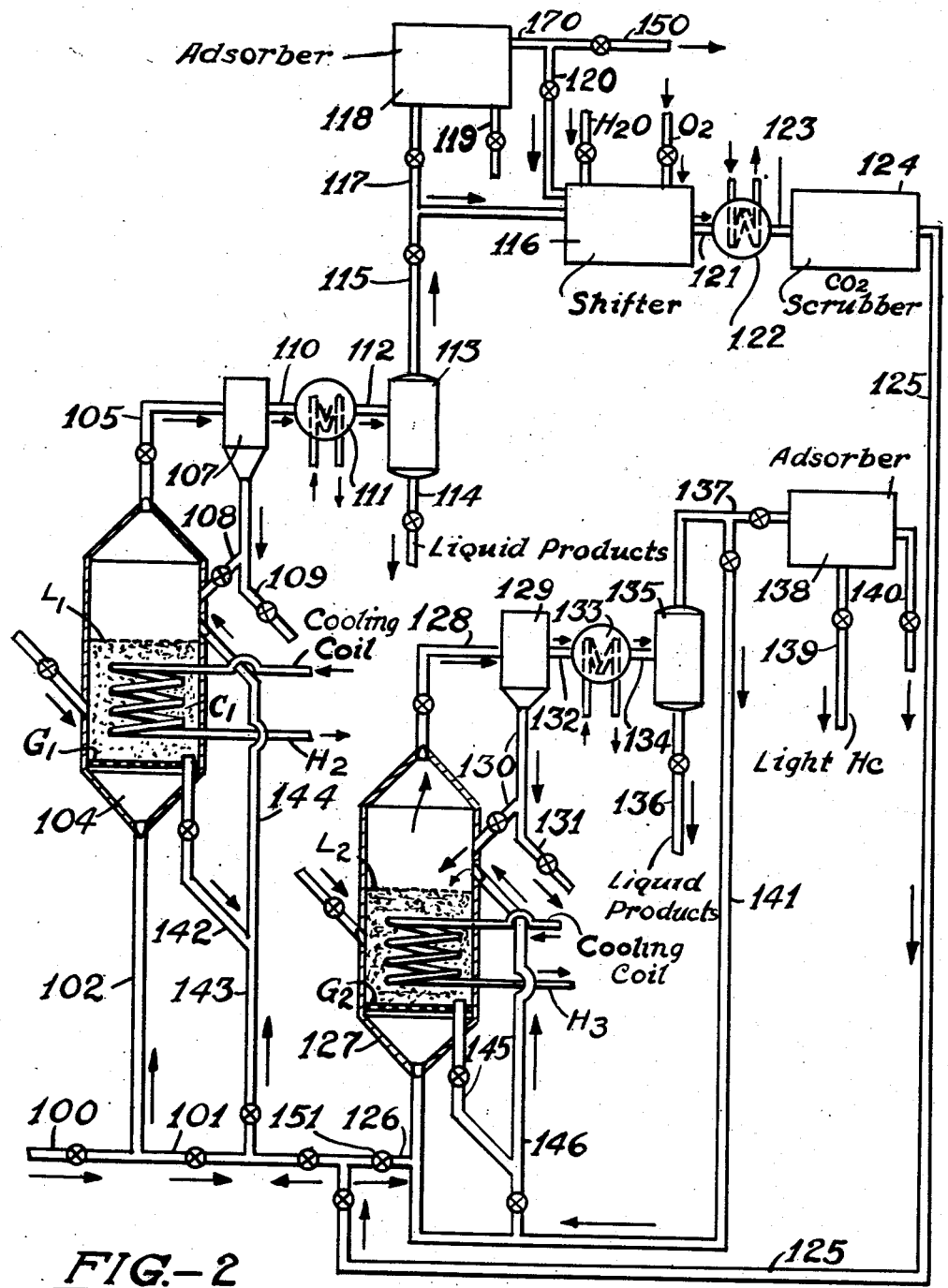

In the accompanying drawings there is shown in Figure 1, in the form of a flow diagram, an apparatus layout in which a preferred modification of the invention may be carried out, this particular embodiment employing a single reactor and recycle of unconverted reactants; and In Figure 2 there is shown another modification of the invention in which two reactors in series are employed with a water gas shift between stages but no other adjustment of the feed.

Referring in detail to the process illustrated in Fig. 1, the operation about to be described is one in which the feed gas containing hydrogen and carbon monoxide is prepared from natural gas by partial oxidation with oxygen according to conventional methods. This process normally results in the production of a feed gas in which the hydrogen to carbon monoxide ratio is of the order of about 1.7 mols of hydrogen per mol of carbon monoxide. This then would be the molar ratio of hydrogen to carbon monoxide in the fresh feed. However, since this is a recycle operation and since the recycle gaseous material has a hydrogen to carbon monoxide ratio of about 1 to 1.4 and when the recycle ratio is about 2, the ratio of hydrogen to carbon monoxide in the total feed is about 1.5.

The fresh feed containing carbon monoxide and hydrogen enters the present system through line 1 and mixes with recycled material from line 3 and thereafter, the mixture is discharged into line 4 from which it is forced into reactor 5 through a grid or other foraminous member G. The reactor contains a body of fluidized powdered cobalt-type catalyst C having an average particle size of from 30 to 60 microns. The catalyst is maintained in the form of a dense, turbulent fluidized mass by causing the gasiform reactants to flow therethrough at a superficial velocity of from ½ to 2 feet per second. By superficial velocity one means the gas velocity at operating conditions of temperature and pressure were there no catalyst in the reactor. Sufficient catalyst is contained in the reactor so as to maintain an upper dense phase level at L. Above the level L the concentration of catalyst in the gasiform material decreases sharply and the exiting gasiform material which is withdrawn through line 6 contains substantially only very fine catalyst such as catalyst having a particle size of less than 20 microns. At the beginning of the operation the amount of material entrained overhead with the exiting gases and vapors is relatively small but as time passes, the amount of such material carried overhead may be substantial. In order to compensate for catalyst lost in the exiting gasiform material, fresh catalyst may be added through valved line 7 in order to keep the amount of catalyst in the reactor substantially constant.

The gasiform material in line 6 is forced through a solids-gas separating device 8 which may be, for instance, a centrifugal separator, and in this separator the catalyst is substantially removed from the vapor and the thus recovered catalyst is withdrawn from the separator 8 through line 9 and a portion of this separated catalyst is returned to the reactor through valved line 10. The remainder of the catalyst separated in 8 is rejected from the system through valved line 11.

It will be understood, of course, that while it is desirable to remove fines from the reactor, nevertheless, a certain quantity of the material having a particle size from 0 to 20 microns, should be maintained therein in order to provide a fluidizable mass. Hence, the material returned through line 10 contains fines and some entrained coarse material.

Without imposing a limitation thereon, but merely to illustrate the general order of particle size and particle size distribution which will give a bed of powdered cobalt adapted to be fluidized readily, the following is set forth:

| Particle Size in Microns | Percent by Weight |
|---|---|
| 0-20 | 10 |
| 20-40 | 35 |
| 40-80 | 45 |
| 80-200 | 10 |

The main point is that the bed should contain some fines (0-20 micron material), but not over 20%, it may contain some coarse material (80+ microns), but the main bulk of the catalyst should average 30-50-60 micron size for best all around performance, such as good heat transfer to cooling surfaces, constant bed volume, high catalyst efficiency, or in other words, high yields of desired products per unit weight of catalyst, etc.

The material withdrawn through line 11 may be reworked to produce catalyst of the proper particle size for further use in the process.

The gasiform material which discharges into separator 8 is withdrawn substantially freed of catalyst, through line 12, thence passed through cooler 13 where normally liquid materials are condensed, and thereafter, the product is discharged via line 14 into separation drum 15. The desired normally liquid product, after separation of water therefrom, is withdrawn from drum 15 through line 16 and delivered to a fractionator 17 where it is subjected to fractional distillation to recover the following products, namely an overhead fraction, which is withdrawn through line 18, and contains naphtha and the lighter hydrocarbons. This material in line 18 is passed through a second cooler 19, and thence discharged into a separation drum 20, from which drum the normally gaseous material is withdrawn overhead through line 21, while the naphtha fraction is withdrawn through line 22, subjected (after removal of water) to treatment with a fluidized mass of powdered cracking catalyst such as silica alumina gels, etc., preferably one of low activity ($D+L$ of 28, or less), for instance, a spent cracking catalyst. This treatment, which is for the purpose of upgrading the naphtha (improved anti-detonation quality), is carried out in a conventional catalytic cracking system consisting primarily of a cracking zone and a catalyst regeneration zone employing the fluid catalyst technique. Following the treatment of the naphtha fraction in system 23, the product is withdrawn through line indicated at 24 and delivered to a finishing still 25, from which product gasoline is recovered through line 26, while the heavy bottoms are withdrawn through line 27. The latter form a minor quantity of the total product and may be used as a domestic heating fuel, since the treatment is rather mild since rich yields of treated product are, of course, desired.

Referring again to fractionator column 17, the bottoms therefrom, comprising gas oil, withdrawn through line 28, may be subjected to catalytic cracking in a conventional cracking system or employed as a diesel fuel.

Referring again to separator 15, the gasiform material separated in separator 15 is withdrawn overhead through line 29 and in part, recycled through line 3 as previously indicated. The material not recycled through line 3 may be delivered to a recovery and polymerization plant 31, in which the $C_3$ and $C_4$ hydrocarbons are separated from the remainder of the material and thence delivered to a polymerization plant where they are converted to polymer gasoline.

It is emphasized that with respect to the recycle stream, the same contains $C_1$, $C_2$, and $C_3$ hydrocarbons and it has been noted that these are not merely diluents in the reactor 1 when returned thereto, but are substantially converted to normally liquid olefinic and aromatic hydrocarbons, which result is reflected in the improved octane rating of the gasoline product. To further improve the product the same may be aftertreated as by contact with a cracking catalyst under cracking conditions as herein disclosed.

Referring again to reactor 1, in order to purify the catalyst and cleanse it of oily and waxy material, the same is withdrawn through a pipe 32 (aerated) continuously and discharged into branch line 33 containing some of the recycle material. In line 33, the adhering oily and waxy material is substantially completely stripped from the catalyst and the mixture of catalyst and gasiform material is returned to the top of the reactor as indicated, the oily and waxy material exiting with the reaction products through line 6.

In Fig. 2, the operation is conducted as shown in the drawing in a two vessel system with a water gas shift step between the reactors.

To the accomplishment of this result, therefore, the feed enters the system shown through line 100 and is then mixed with recycled gasiform material from line 101 and discharged via feed inlet line 102 into reactor 104. Reactor 104 contains a fluidized mass of catalyst $C_1$ which has an upper dense phase level at $L_1$ and the gasiform feed is caused to flow through a distributing grid or the like $G_1$. The effluent vapors resulting from the reaction exit from the reactor through line 105. Since these vapors contain fines and coarse material entrained therein, they are forced through a solids-gas separating device 107 for the purpose of separating at least a portion of this catalyst material and returning it through line 108 in part, and in part rejecting it from the system through line 109. The gasiform vapors are withdrawn from separator 107, through line 110, thence through a cooler 111 where they are cooled sufficiently to liquify normally liquid products of the reaction including, of course, the water, the hydrocarbons and any minor amount of oxygenated hydrocarbons. The liquified products are then conveyed by line 112 into a separation drum 113. From the bottom of separator 113, through line 114, the normally liquid products are withdrawn and these may be purified to recover desired products in a treater similar to 23 of Fig. 1.

The normally gaseous material is withdrawn overhead from separator 113, through line 115, and is discharged into a water gas shifter 116 where it is treated with steam with or without oxygen under known conditions in order to convert the CO and steam to $CO_2$ and hydrogen, as well as to convert some methane to CO and hydrogen.

Alternatively, the gasiform material in line 115 may be passed via line 117 into a conventional absorber 118 where it is treated with a lean absorbent oil to remove hydrocarbons of higher molecular weight than ethane. The fat liquor from this operation may be withdrawn through line 119, whereas the gas containing $C_1$ and $C_2$ hydrocarbons now substantially freed of heavier hydrocarbons, is withdrawn through 120 and discharged into water gas shifter 116, through line 121, cooled in cooler 122 and thence discharged via 123 into a $CO_2$ scrubbing zone 124 containing a conventional solvent for $CO_2$. The vapors substantially freed of $CO_2$ are then withdrawn through line 125 and may be recycled in part through line 101 to line 102 and thence to reactor 104. The main portion of the vapors in line 125 is discharged through line 126 into the bottom of a second reactor 127 also containing a catalyst, $C_2$, in the form of fluidized bed. As usual, the fluidized mass of catalyst forms an upper dense phase level at $L_2$ and the reactor is provided with the conventional perforate distributing means $G_2$.

The reactant vapors are withdrawn from reactor 127 through line 128, and as before, are forced through gas-solid separating device 129 wherein fines and coarser material are separated from the gasiform material and returned, in part, through line 130 into reactor 127. Another portion of the withdrawn catalyst is rejected from the system through line 131.

The vapors issuing from separator 129 are forced through line 132, thence through a cooler 133 where normally liquid products are condensed, and thereafter the cooled material is forced through line 134 into a separator 135. The bottoms comprising the liquid products are withdrawn from separator 135, through line 136 and these may be combined with the liquid products of the first stage in line 114 and delivered after separation of water to a fluid treater, that is, to a reactor or treater containing a fluidized mass of cracking catalyst, this operation being similar to that carried out in 23 of Fig. 1.

The gasiform material is withdrawn from separator 135, through line 137 and delivered to a conventional absorber 138 wherein it is treated with a normally liquid lean hydrocarbon oil for the purpose of separating out hydrocarbons containing more than 2 carbon atoms, whereupon the fat liquor containing these absorbed hydrocarbons is withdrawn through line 139. The $C_1$ and $C_2$ hydrocarbons are withdrawn through line 140 and rejected from the system or returned to the apparatus not shown for production of the synthesis gas in line 100.

Referring again to the gasiform material in line 137, a portion of this gasiform material may be recycled to the reactor through line 141.

As in the modification shown in Fig. 1, it is desirable for best operation that the catalyst be withdrawn continuously or intermittently at frequent intervals to cleanse the same by removing oily and waxy material therefrom, thus from reactor 127 the catalyst is withdrawn through line 145 (aerated) and thence discharged into line 146 containing a portion of the recycled gasiform material in line 141. The contaminated catalyst is carried in suspension through line 146 into the reactor 127 above the dense phase level $L_2$ and during its passage in this transfer line, the oily and waxy material is substantially stripped from the catalyst and exits from the reactor with the other products of the reaction through line 128.

Reactors 5, 104 and 127 are provided with suitable cooling means $H_1$, $H_2$ and $H_3$ respectively. These may take the form of coils imbedded in the fluidized mass through which is circulated a suitable flowing coolant such as steam or water.

An alternate method of operating the plant depicted in Fig. 2 is to withdraw from the system, through line 150, excess $C_1$ and $C_2$ hydrocarbons and unconverted CO and $H_2$, and at the same time closing valve 151 in line 126 and directing all of the remaining gasiform material in line 125 to reactor 104. In this modification, it will be noted that although similar to the process described previously and illustrated in Fig. 1 in that a single vessel is employed with recycling, the present modification differs in that the gasiform material is "shifted"

$$(CO+H_2O \rightarrow CO_2+H_2)$$

prior to recycling to the reaction zone.

Having described several modifications of the invention while referring to the drawings, there are now set forth below operating conditions and temperature, pressure etc., which embody preferred modifications of the invention.

In the process illustrated in Fig. 1 the catalyst indicated is a cobalt type catalyst. It is important that the average size of the catalyst should be less than 60 microns, preferably as small as 30 microns average size, so that it is adapted for good fluidization in the reactor and the maximum surface of catalyst per unit per weight of catalytic material will be afforded to the reacting gases. In other words, the catalyst average particle size should be between 30 and 60 microns, which is a size range which provides a maximum surface per unit weight of catalyst, and at the same time, is adapted for good fluidization.

Regarding the composition of this cobalt type catalyst, it should consist of cobalt metal precipitated on an inert carrier, such as kieselguhr, silica gel, alumina gels, alundum, or other materials essentially made up of silica and/or alumina. There are many physical modifications of these materials which are obtained by different methods of drying and sintering. It is desirable that the modifications give the greatest mechanical strength to the carrying materials chosen. The preferred carrier is silica gel.

A good way to prepare the catalyst is to impregnate dry silica gel with, say, cobalt nitrate and soluble salts of promoters mentioned below, then treat with ammonium hydroxide to precipitate cobalt hydroxide, thereafter dry and then reduce with a hydrogen-containing gas at a temperature of about 350° to 500° F. In addition, the catalyst should contain an activator, such as thoria, magnesia, manganese, and in addition, small portions of an alkaline metal compound, such as sodium carbonate etc. These may be included in the composition as indicated previously. A preferred composition of the catalyst is one with 100 parts by weight of cobalt, as metal, 4 parts of thoria, 4 parts of magnesia and 200 parts of the inert carrier, e. g. silica gel. This catalyst may be promoted with sodium carbonate to give 1 to 2% $Na_2O$ on the total catalyst composition. Upward of 10% by weight of iron may be incorporated in the catalyst with advantage, giving a greater yield of olefins.

In the fluid vessels described hereinbefore, it will be understood that the fluidizing reactants are forced through the reactor at a velocity sufficient to cause formation of the fluidized mass. Usually, this velocity (measured as though there were no catalyst in the reactor and at operating conditions, temperature and pressure) is of the order of ½ to 3 ft. per second.

Conditions in reactor 5

|  | Range | Preferred |
|---|---|---|
| Temperature, °F | 450–600 | 525 |
| Pressure, p. s. i | 25–250 | 75 |
| Feed Rate, C. F., CO+$H_2$/lb. Cat | 2–50 | 15 |
| Recycle Ratio, Recycle/fresh feed | 1–5 | 2 |
| $H_2$/CO in total feed | 1.2–1.6 | 1.5 |
| Conversion (CO+$H_2$), Percent | 80–95 | 90 |

Conditions in reactor 104

|  | Range | Preferred |
|---|---|---|
| Temperature, °F | 450–600 | 500 |
| Pressure, p. s. i | 25–250 | 75 |
| Feed Rate, C. F., CO+$H_2$/lb. Cat | 2–50 | 10 |
| Recycle Ratio, Recycle/fresh feed | 0.2–1.0 | 0.5 |
| $H_2$/CO in total feed | 0.8–1.4 | 1.1 |
| Conversion (CO+$H_2$), Percent | 50–70 | 60 |

Conditions in reactor 127

|  | Range | Preferred |
|---|---|---|
| Temperature, °F | 450–600 | 535 |
| Pressure, p. s. i | 25–250 | 75 |
| Feed Rate, C. F., CO+$H_2$/lb. Cat | 2–50 | 10 |
| Recycle Ratio, Recycle/fresh feed | 0.1–0.8 | 0.3 |
| $H_2$/CO in total feed | 1.0–1.8 | 1.7 |
| Conversion (CO+$H_2$), Percent | 25–45 | 35 |

Treater 23

|  | Range | Preferred |
|---|---|---|
| Temperature, °F | 700–950 | 900 |
| Pressure, p. s. i | 15–100 | 50 |
| Feed Rate, lbs. oil/hr./lb. Cat | 0.5–30 | 5 |
| Conversion, wt. percent $C_5$+ to $C_4$− | 3–10 | 7–8 |

As hereinbefore indicated the preferred ratio of hydrogen to carbon monoxide in the total feed charged to the several reactors is the same range, 1.1 to 1.7 mols $H_2$ per mol CO, and less than the normal total feed ratio of 2 mols $H_2$ per mol CO for a cobalt catalyst. However, the fresh feed to the reactors is not the same and is governed by the source. Thus, in the modification shown in Fig. 1, the fresh feed is prepared by reforming (methane-steam reaction), methane or natural gas, and the hydrogen to CO ratio of about 1.7 is higher than where the fresh feed is prepared by gasifying coal or the like. In the modification shown in Fig. 2, where the fresh feed gas is made by gasifying coal with steam, since feed gas has a $H_2$/CO ratio of 0.8 to 1.4 and is deficient in hydrogen, it is necessary to subject it to a water gas shift reaction to proportion the ratios of hydrogen to CO. In the case of the total feed to the reactors shown in Figs. 1 and 2, the ratio of hydrogen to CO is within the limits of .8 to 1.5, accomplished either by recycling unconverted material (Fig. 1) or shifting the unconverted material prior to recycling or charging to the second reactor (Fig. 2).

In order to further illustrate the invention, there is set forth below a specific example.

A run was made in a fluid reactor at 75 p. s. i. pressure with a catalyst ground to 6% 0–20 mu, 5% 20–40 mu, 37% 40–80 mu and 52% 80+ mu size. It had the following composition: 30.7% cobalt, 2.6% magnesia and 66.7% silica, the latter being a silica gel carrier. The fresh feed had 1.5–1.6 $H_2$/CO ratio and 3.1–3.5 parts of tail or recycle gas were recycled per part of fresh feed. The fresh feed rate was about 10 CF $H_2$+CO/hr./lb. catalyst. The following results, which are characteristic of operations pictured in Fig. 1, were obtained:

| Temperatures, °F | 432 | 500 |
|---|---|---|
| $H_2$+CO conv. vol. percent | 38.4 | 73.9 |
| Yields, cc./m.³ CO+$H_2$ converted: | | |
| $C_3$+Hydrocarbons | 209 | 204 |
| $C_4$+Hydrocarbons | 184 | 182 |
| Collected liquid: | | |
| °API | 53.2 | 57.5 |
| Bromine No | 21.0 | 24.0 |
| Aniline point | 178 | 156 |
| Distillation: | | |
| Initial, °F | 198 | 150 |
| 10%, °F | 283 | 235 |
| 50%, °F | 467 | 374 |
| 80%, °F | 628 | 500 |
| Percent at 400° F | 35 | 56 |

These data show that increasing the temperature from 432° F. to 500° F. had the beneficial effects of about doubling the conversion of fresh feed gas, increasing the bromine number, decreasing the aniline point and increasing substantially the percentage of gasoline in the collected oil sample without decreasing the selectivity or yield of liquid products per volume of $H_2$+CO converted. This is contrary to existing literature on hydrocarbon synthesis with cobalt type catalysts which uniformily stated that synthesis at temperatures above 425° F. resulted in a large increase in the yields of methane and carbone dioxide. No change in the former is indicated by the similar yields of $C_3$+ hydrocarbons and, since the $H_2$/CO consumption ratio was 2.0–2.2 in the 500° F. test, there was little or no production of carbon dioxide. These experiments were repeated several times with the foregoing results.

As previously indicated substantial quantities of fines are removed overhead from the reactors (e. g. reactor 5) with the exiting reaction vapors by elutriation or entrainment. This is a desirable condition because these fines may become wetted with heavy oily or waxy material in the reactor if they are permitted to remain therein indefinitely and interfere with good fluidization by adhering to the walls of the reactor or to cooling surfaces, thus stagnating on such surfaces, eventually packing or solidifying to a hard mass.

The advantages of the present invention are:

(1) Maximum yields of gasoline and lighter hydrocarbons.
(2) High olefin contents of the gasoline and lighter hydrocarbons.
(3) The attainment of motor gasoline from the processes described herein, having an A. S. T. M. of 70 to 75 or higher.
(4) The attainment of high CO conversion (95% or better) even though the ratio of hydrogen to CO in the total feed is relatively low.
(5) Minimizes problem of carbon deposits on catalyst, characteristic of the hydrocarbon synthesis using iron; which deposit weakens the catalyst and causes formation of inordinately large quantities of fines.

Numerous modifications of the invention may be made by those familiar with this art without departing from the spirit thereof.

What is claimed is:

The method of synthesizing hydrocarbons, including normally liquid hydrocarbons which comprises charging a feed gas containing hydrogen and carbon monoxide in the ratio of about 0.9 to 1.5 mols of hydrogen per mol of carbon monoxide to a reaction zone containing a fluidized mass of cobalt type catalyst, maintaining a temperature within the reaction zone of about 450° to 500° F., permitting the reactants to remain resident in contact with the catalyst for a sufficient period of time to convert 40 to 50% of the carbon monoxide, withdrawing the reaction products from the reaction zone, condensing normally liquid constituents, separating uncondensed gasiform material, subjecting the said gasiform material to a water gas shift reaction, removing carbon dioxide from the thus treated gasiform material, charging the resulting gasiform material to a second reaction zone containing a fluidized mass of cobalt type catalyst, subjecting the reactants to synthesis conditions of temperature and pressure in said second reaction zone for a sufficient period of time to effect the desired conversion, recovering a product from said second reaction zone, condensing normally liquid constituents contained in said product and recovering the desired products from both of said reaction zones.

CHARLES E. HEMMINGER.

References Cited in the file of this patent

UNITED STATES PATENTS

| Number | Name | Date |
|---|---|---|
| 2,220,357 | Steinschlager | Nov. 5, 1940 |
| 2,224,048 | Herbert | Dec. 3, 1940 |
| 2,253,607 | Boyd et al. | Aug. 26, 1941 |
| 2,271,259 | Herbert | Jan. 27, 1942 |
| 2,274,064 | Howard | Feb. 24, 1942 |
| 2,274,639 | Scheinermann et al. | Mar. 3, 1942 |
| 2,287,891 | Linckh | June 30, 1942 |
| 2,417,164 | Huber | Mar. 11, 1947 |
| 2,445,795 | Millendorf | July 27, 1948 |
| 2,447,505 | Johnson | Aug. 24, 1948 |
| 2,451,879 | Scharmann | Oct. 19, 1948 |

FOREIGN PATENTS

| Number | Country | Date |
|---|---|---|
| 581,174 | Great Britain | Oct. 3, 1946 |

OTHER REFERENCES

Anderson et al.: Fischer-Tropsch Synthesis Etc., vol. 39, No. 12, Ind. and Engineering Chemistry, pages 1548–1554.